United States Patent
Lee et al.

(10) Patent No.: US 10,195,586 B2
(45) Date of Patent: Feb. 5, 2019

(54) REDUCED TITANIUM DIOXIDE AND PREPARING METHOD OF THE SAME

(71) Applicant: RESEARCH & BUSINESS FOUNDATION SUNGKYUNKWAN UNIVERSITY, Suwon-si (KR)

(72) Inventors: Hyoyoung Lee, Suwon-si (KR); Luyang Wang, Suwon-si (KR); Youngmin Kim, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 133 days.

(21) Appl. No.: 15/041,591

(22) Filed: Feb. 11, 2016

(65) Prior Publication Data
US 2016/0236175 A1  Aug. 18, 2016

(30) Foreign Application Priority Data
Feb. 11, 2015 (KR) .................. 10-2015-0020794

(51) Int. Cl.
| | |
|---|---|
| B01J 21/06 | (2006.01) |
| B01J 37/06 | (2006.01) |
| C01G 23/08 | (2006.01) |
| B01J 37/16 | (2006.01) |
| B01J 35/00 | (2006.01) |

(52) U.S. Cl.
CPC ........... *B01J 21/063* (2013.01); *B01J 35/004* (2013.01); *B01J 37/06* (2013.01); *B01J 37/16* (2013.01); *C01G 23/08* (2013.01); *B01J 35/0033* (2013.01); *C01P 2002/72* (2013.01); *C01P 2002/84* (2013.01); *C01P 2004/04* (2013.01)

(58) Field of Classification Search
CPC ........ B01J 21/063; B01J 35/004; B01J 37/06; B01J 37/16; C01G 23/08
See application file for complete search history.

(56) References Cited

FOREIGN PATENT DOCUMENTS

CN        105753043 A  *  7/2016  ........... C01G 23/047

OTHER PUBLICATIONS

Zheng et al (Kinetic reconstruction of TiO2 surfaces as visible-light-active crystalline phases with high photocatalytic performance, J Mat Chem A, 2, (2014) 4907-4911).*
He et al (Hydrogenation of Nano-Structured TiO2 Photocatalyst Through an Electrochemical Method, J Nanosci and Nanotech, 15 (2015) 303-308 published Jan. 1, 2015).*
Chen, Xiaobo, et al., "Increasing Solar Absorption for Photocatalysis with Black Hydrogenated Titanium Dioxide Nanocrystals", Science, vol. 331, No. 6018, Feb. 11, 2011, pp. 746-750.
Zhang, Kan, et al., "An order/disorder/water junction system for highly efficient co-catalyst-free photocatalytic hydrogen generation", The Royal Society of Chemistry 2015, Energy & Environmental Science, Nov. 18, 2015 (32 pages).
(Continued)

*Primary Examiner* — Melvin C. Mayes
*Assistant Examiner* — Michael Forrest
(74) *Attorney, Agent, or Firm* — NSIP Law (57) ABSTRACT

The following description related to a reduced titanium dioxide, which is formed by reducing rutile titanium dioxide and includes a disordered surface, a preparing method the same, and a photocatalyst including the reduced titanium dioxide.

15 Claims, 9 Drawing Sheets

(56) References Cited

OTHER PUBLICATIONS

Luyang Wang, et al., "Facile preparation of an n-type reduced graphene oxide field effect transistor at room temperature," *Royal Society of Chemistry—ChemComm,* vol. 50, 2014, pp. 1224-1226.
Xiaobo Chen, et al., "Black titanium dioxide ($TiO_2$) nanomaterials," *Royal Society of Chemistry—Chem Soc Rev,* vol. 44, 2015, pp. 1861-1885.

* cited by examiner

REDUCED TITANIUM DIOXIDE AND PREPARING METHOD OF THE SAME

CROSS-REFERENCE TO RELATED APPLICATION

This application claims the benefit under 35 USC 119(a) of Korean Patent Application No. 10-2015-0020794 filed on Feb. 11, 2015, in the Korean Intellectual Property Office, the entire disclosure of which is incorporated herein by reference for all purposes.

TECHNICAL FIELD

The present disclosure relates to a reduced titanium dioxide, a preparing method of the same, and a photocatalyst including the reduced titanium dioxide.

BACKGROUND

Along with energy crisis, many people have been looking for clean energy for eco-friendly development. Semiconductor-based photocatalysts are one of the most attractive candidates for photosensitized decomposition of water capable of producing hydrogen during a process. Among the photocatalysts, $TiO_2$ having relatively high reactivity and chemical stability under ultraviolet irradiation has received attention. $TiO_2$ nanoparticles have a large surface area for a high speed of a surface reaction and thus have been widely used as a photocatalyst for various solar-based clean energy and environmental technologies.

In order to maximize absorption of $TiO_2$ under the sunlight, many researchers have already tried to modify the composition of $TiO_2$ by performing additional doping with metals, inorganic substances, and $Ti^{3+}$. The light absorbing property of $TiO_2$ has been improved by doping. By way of example, nitrogen-doped $TiO_2$ reacts upon irradiation of the sunlight, but still insufficiently absorbs visible light and infrared light.

Conventionally, many researches tried to reduce a band gap of $TiO_2$ with respect to the sunlight and increase absorption of the sunlight by using various methods and reagents.

Meanwhile, in 2011, X. B Chen et. al. first reduced $TiO_2$ whose surface morphology was modified with a hydrogen gas, and formed a disordered layer on a surface of $TiO_2$ [Xiaobo Chen, Lei Liu, Peter Y. Yu and Samuel S. Mao, "Increasing Solar Absorption for Photocatalysis with Black Hydrogenated Titanium Dioxide Nanocrystals" Science, vol. 331, no. 6018 (Feb. 11, 2011), pp. 746-750]. Light absorption and charge separation was also increased. Various conditions for $TiO_2$ treated with hydrogen according to the present method have been disclosed in numerous articles and publications. However, annealing with a $H_2$ gas at an ultra-high temperature is very dangerous in industrial production. Accordingly, a novel preparing method as an alternative to the conventional technology needs to be searched.

SUMMARY

In view of the foregoing, the present disclosure provides reduced titanium dioxide, a preparing method the same, and a photocatalyst including the reduced titanium dioxide.

However, problems to be solved by the present disclosure are not limited to the above-described problems. Although not described herein, other problems to be solved by the present disclosure can be clearly understood by those skilled in the art from the following descriptions.

In accordance with a first aspect of the present disclosure, there is provided a method of preparing reduced titanium dioxide, including: mixing a metal-containing material with an amine-containing solvent to obtain a solution containing the metal and the amine; and obtaining the reduced titanium dioxide by mixing the solution containing the metal and the amine with titanium dioxide.

In accordance with an embodiment of the present disclosure, the method of preparing reduced titanium dioxide may further include: removing impurities from the reduced titanium dioxide using a solution selected from the group consisting of water, ethanol, an acid solution, an organic solvent, and combinations thereof, but may not be limited thereto.

In accordance with an embodiment of the present disclosure, the impurities may include remaining metal and a metal hydroxide, but may not be limited thereto.

In accordance with an embodiment of the present disclosure, the obtaining of reduced titanium dioxide may be performed at a temperature in a range of from about −40° C. to about 200° C., but may not be limited thereto.

In accordance with an embodiment of the present disclosure, the metal-containing material may include a metal selected from the group consisting of Li, Na, K, Rb, Cs, Fr, Be, Mg, Ca, Sr, Ba, Ra, and combinations thereof, but may not be limited thereto.

In accordance with an embodiment of the present disclosure, the amine-containing solvent may include a $C_1$-$C_{21}$ alkylamine or ammonia, but may not be limited thereto.

In accordance with an embodiment of the present disclosure, the solution containing the metal and the amine may have basic property, but may not be limited thereto.

In accordance with a second aspect of the present disclosure, there is provided reduced titanium dioxide, which is formed by reducing rutile titanium dioxide and includes a disordered surface.

In accordance with an embodiment of the present disclosure, the reduced titanium dioxide may show black color, but may not be limited thereto.

In accordance with an embodiment of the present disclosure, the reduced titanium dioxide may show blue color since it is formed by selectively reducing only the rutile titanium dioxide in titanium dioxide in which the rutile titanium dioxide coexists with anatase-titanium dioxide, but may not be limited thereto.

In accordance with a third aspect of the present disclosure, there is provided a photocatalyst including the reduced titanium dioxide in accordance with the above-described aspect of the present disclosure.

In accordance with an embodiment of the present disclosure, without a need to perform a heat treatment at a high temperature for a long time as in the conventional method of using a $H_2$ gas, it is possible to sufficiently easily prepare reduced titanium dioxide at room temperature or low temperature and also possible to mass-produce reduced titanium dioxide through a solution process.

In accordance with an embodiment of the present disclosure, when reduced titanium dioxide is prepared, it is possible to perform a reaction and rinsing using a solution selected from the group consisting of water, ethanol, an acid solution, an organic solvent, and combinations thereof. Since it is possible to perform a reaction and rinsing using particularly water and/or ethanol only, it is possible to provide an economical and effective method of preparing reduced titanium dioxide.

In accordance with an embodiment of the present disclosure, it is possible to provide reduced titanium dioxide having a narrow band gap.

Here, we demonstrate a selective reduction of commercialized Degussa P-25 $TiO_2$ nanoparticles using simple room-temperature solution processing, which maintains the unique three-phase interfaces composed of ordered white-anatase and disordered black-rutile with open structures for easy electrolyte access. The strong reducing agent in superbase, which consists of lithium in ethylenediamine (Li-EDA), can disorder only the white-rutile phase of P-25. Single P-25 $TiO_2$ nanoparticles with this engineered surface made immediate contact with the electrolyte. This contact is called white-black-electrolyte three-phase interfaces and can not only efficiently internally separate electrons/holes through type-II bandgap alignment but also induce a strong hydrogen ($H_2$) evolution surface reaction. The white-black-electrolyte three-phase interfaces exhibited outstanding $H_2$ production rates of 13.89 mmol/h/g using 0.5 wt. % Pt (co-catalyst) and 3.46 mmol/h/g without using any co-catalyst. These values are the highest recorded in the world to date.

BRIEF DESCRIPTION OF THE DRAWINGS in the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Hereinafter, embodiments and examples of the present disclosure will be described in detail with reference to the accompanying drawings so that the present disclosure may be readily implemented by those skilled in the art. However, it is to be noted that the present disclosure is not limited to the embodiments and examples but can be embodied in various other ways. In drawings, parts irrelevant to the description are omitted for simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

The term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Through the whole document, the term "alkyl" may include a $C_{1-21}$ straight or branched chain alkyl group, a $C_{1-15}$ straight or branched chain alkyl group, a $C_{1-10}$ straight or branched chain alkyl group, a $C_{1-8}$ straight or branched chain alkyl group, or a $C_{1-5}$ straight or branched chain alkyl group, and may include, for example, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, or all available isomers thereof, but may not be limited thereto.

Hereinafter, embodiments of the present disclosure will be described in detail. However, the present disclosure may not be limited to the following embodiments.

In a first aspect of the present disclosure, there is provided a method of preparing reduced titanium dioxide, including: mixing a metal-containing material with an amine-containing solvent to obtain a solution containing the metal and the amine; and obtaining the reduced titanium dioxide (reduced $TiO_2$) by mixing the solution containing the metal and the amine with titanium dioxide ($TiO_2$).

In an embodiment of the present disclosure, the method of preparing reduced titanium dioxide may further include: removing impurities from the reduced titanium dioxide using a solution selected from the group consisting of water, ethanol, an acid solution, an organic solvent, and combinations thereof, but may not be limited thereto. In an embodiment of the present disclosure, since it is possible to perform rinsing with water and/or ethanol only, it is possible to economically and effectively prepare reduced titanium dioxide, but may not be limited thereto. By way of example, the acid solution may include one selected from the group consisting of hydrochloric acid, nitric acid, sulfuric acid, phosphoric acid, iodic acid, bromic acid, acetic acid, and combinations thereof, but may not be limited thereto. By way of example, the organic solvent may include one selected from the group consisting of alcohols such as methanol, ethanol, propanol, or butanol; or dichloromethane, dimethylformamid, N-methylpyrrolidone, methylpyrrolidone, acetone, acetonitrile, tetrahydrofuran, toluene, and combinations thereof, but may not be limited thereto.

In an embodiment of the present disclosure, the impurities may include remaining metal and a metal hydroxide, but may not be limited thereto.

In an embodiment of the present disclosure, the obtaining of reduced titanium dioxide may be performed at a temperature in a range of from about −40° C. to about 200° C., but may not be limited thereto. The obtaining of reduced titanium dioxide may be performed at desirably room temperature (from about 15° C. to about 30° C.), and may be performed at a low temperature (about −33° C.) if ammonia is used as the amine-containing solvent, but may not be limited thereto. By way of example, the temperature may be in a range of from about −40° C. to about 200° C., from about −20° C. to about 175° C., from about 0° C. to about 150° C., from about 10° C. to about 100° C., from about 15° C. to about 50° C., from about 20° C. to about 30° C., from about 15° C. to about 30° C., from about 15° C. to about 25° C., or from about 25° C. to about 30° C., but may not be limited thereto.

In an embodiment of the present disclosure, the metal-containing material may include an alkaline metal or alkaline earth metal. By way of example, the metal-containing material may include a metal selected from the group consisting of Li, Na, K, Rb, Cs, Fr, Be, Mg, Ca, Sr, Ba, Ra, and combinations thereof, but may not be limited thereto. By way of example, the metal-containing material may be n-butyl lithium (n-Bu-Li) or tert-butyl lithium (t-Bu-Li), but may not be limited thereto.

In an embodiment of the present disclosure, the amine-containing solvent may include a $C_1$-$C_{21}$ alkylamine or ammonia, but may not be limited thereto. The $C_1$-$C_{21}$ alkylamine may be represented as $HN_2$—$(CH_2)_n$—$NH_2$ (n=1 to 20), $H_2N$—$(CH_2)_n$—$NH_2$ (n=1 to 20), $HN_2$—$(CH_2)_n$—$CH_3$ (n=0 to 20), $H_2N$—$(CH_2)_n$—$CH_3$ (n=0 to 20), $HN_2$—$(CH_2)_n$—$NH$—$CH_3$ (n=0 to 20), or $H_2N$—$(CH_2)_n$—$NH$—$CH_3$ (n=0 to 20), but may not be limited thereto. By way of example, the amine-containing solvent may be ethylenediamine, propylamine, 1,2-diaminopropane, or lithium diisopropylamide, but may not be limited thereto.

Generally, reduction using ammonia is called Birch reduction. The Birch reduction refers to a reduction caused by a metal in liquid ammonia, and more specifically, to a reduction caused by solvated electrons generated by dissolution of a metal. By way of example, the metal may be sodium, lithium, potassium, calcium, or magnesium, but may not be limited thereto. Since ammonia is liquefied at about −33.34° C., if ammonia is used as the amine-containing solvent, it is possible to perform a reduction of titanium dioxide even at a low temperature (about −33° C.).

In an embodiment of the present disclosure, the titanium dioxide may include titanium dioxide nanocrystals in a dehydrated state, but may not be limited thereto. By way of example, the titanium dioxide nanocrystals in a dehydrated state may include anatase having a size of about 25 nm or less, rutile having a size of about 140 nm or less, or P25-type having a size of from about 20 nm to about 40 nm, but may not be limited thereto. The P25-type may refer to a nanocrystal in which rutile and anatase coexist with each other.

In an embodiment of the present disclosure, the solution containing the metal and the amine may have basic property, but may not be limited thereto. Since the solution containing the metal and the amine has basic property, $TiO_2$ can be reduced at room temperature. Therefore, in the method of preparing reduced titanium dioxide in accordance with an embodiment of the present disclosure, without a need to perform a heat treatment at a high temperature for a long time as in the method of using a $H_2$ gas, it is possible to sufficiently easily prepare reduced titanium dioxide at room.

Reduced titanium dioxide prepared by the method in accordance with an embodiment of the present disclosure may have a narrow band gap. Due to the narrow band gap of the reduced titanium dioxide, the reduced titanium dioxide can absorb a light (UV) having lower energy and thus emit more electrons than conventional titanium dioxide.

In a second aspect of the present disclosure, there is provided reduced titanium dioxide, which is formed by reducing rutile titanium dioxide and includes a disordered surface.

In accordance with an embodiment of the present disclosure, the reduced titanium dioxide may show black color, but may not be limited thereto.

In accordance with an embodiment of the present disclosure, the reduced titanium dioxide may show blue color since it is formed by selectively reducing only the rutile titanium dioxide in titanium dioxide in which the rutile titanium dioxide coexists with anatase-titanium dioxide, but may not be limited thereto.

In an embodiment of the present disclosure, the reduced titanium dioxide may have a narrow band gap. Due to the narrow band gap of the reduced titanium dioxide, the reduced titanium dioxide can absorb a light (UV) having lower energy and thus emit more electrons than conventional titanium dioxide.

In an embodiment of the present disclosure, the reduced titanium dioxide may be prepared by obtaining a solution containing the metal and the amine by mixing a metal-containing material with an amine-containing solvent, and then mixing solution containing the metal and the amine with titanium dioxide.

In an embodiment of the present disclosure, the metal-containing material may include an alkaline metal or alkaline earth metal. By way of example, the metal-containing material may include a metal selected from the group consisting of Li, Na, K, Rb, Cs, Fr, Be, Mg, Ca, Sr, Ba, Ra, and combinations thereof, but may not be limited thereto.

In an embodiment of the present disclosure, the amine-containing solvent may include a $C_1$-$C_{21}$ alkylamine or ammonia, but may not be limited thereto. The $C_1$-$C_{21}$ alkylamine may be represented as $HN_2$—$(CH_2)_n$—$NH_2$ (n=1 to 20), $H_2N$—$(CH_2)_n$—$NH_2$ (n=1 to 20), $HN_2$—$(CH_2)_n$—$CH_3$ (n=0 to 20), $H_2N$—$(CH_2)_n$—$CH_3$ (n=0 to 20), $HN_2$—$(CH_2)_n$—$NH$—$CH_3$ (n=0 to 20), or $H_2N$—$(CH_2)_n$—$NH$—$CH_3$ (n=0 to 20), but may not be limited thereto. By way of example, the amine-containing solvent may be ethylenediamine, propylamine, 1,2-diaminopropane, or lithium diisopropylamide, but may not be limited thereto, but may not be limited thereto.

In an embodiment of the present disclosure, the titanium dioxide may include titanium dioxide nanocrystals in a dehydrated state, but may not be limited thereto. By way of example, the titanium dioxide nanocrystals in a dehydrated state may include anatase having a size of about 25 nm or less, rutile having a size of about 140 nm or less, or P25-type having a size of from about 20 nm to about 40 nm, but may not be limited thereto. The P25-type may refer to a nanocrystal in which rutile and anatase coexist with each other at a ratio of about 1:3.

In accordance with an embodiment of the present disclosure, in the titanium dioxide nanocrystal in which rutile titanium dioxide and anatase titanium dioxide coexist with each other, only the rutile titanium dioxide may be selectively reduced. This case demonstrates a phase selective conversion of commercial P-25 into ordered anatase $TiO_2$ and disordered rutile $TiO_2$ with open structure using simple room-temperature solution processing. The reducing agent, lithium in ethylenediamine (Li-EDA), was developed for the first time to achieve three-phase interfaces when its resultant, so called blue $TiO_2$.

In an embodiment of the present disclosure, the obtaining of reduced titanium dioxide may be performed at a temperature in a range of from about −40° C. to about 200° C. The obtaining of reduced titanium dioxide may be performed at desirably room temperature (from about 15° C. to about 30° C.), and may be performed at a low temperature (about −33° C.) if ammonia is used as the amine-containing solvent, but may not be limited thereto. By way of example, the temperature may be in a range of from about −40° C. to about 200° C., from about −20° C. to about 175° C., from about 0° C. to about 150° C., from about 10° C. to about 100° C., from about 15° C. to about 50° C., from about 20° C. to about 30° C., from about 15° C. to about 30° C., from about 15° C. to about 25° C., or from about 25° C. to about 30° C., but may not be limited thereto.

In a third aspect of the present disclosure, there is provided a photocatalyst including the reduced titanium dioxide in accordance with the above-described aspect of the present disclosure. All the descriptions about the reduced titanium dioxide and the method of preparing the same in accordance with the first and second aspects of the present disclosure can be applied to the photocatalyst in accordance with the third aspect of the present disclosure.

Herein, we found that the unconventional formation of three-phase interfaces of $TiO_2$ nanoparticles dispersed in water, achieved by room-temperature solution processing. A reducing agent evolved from superbase, Li/EDA, could attack R—$TiO_2$ selectively while well-maintain A-$TiO_2$, as predicted in our simulation. The mechanism could be ascribed to the large gap in the protonation constants between R—$TiO_2$ and A-$TiO_2$ against pH conditions. A commercial Janus photocatalyst, Degussa P-25, is an acknowledged standard for verifying the success of photocatalyst. It has good charge separation efficiency because of the well-formed type-11 band alignment at the A-$TiO_2$ and R—$TiO_2$ interface, and also is a good parent material for our three-phase interfaces engineering. Janus P-25 with anatase/rutile crystals converted to Janus blue $TiO_2$ nanoparticles with intimate ordered/disordered crystals have formed novel white-black-electrolyte three-phase interfaces in aqueous electrolyte, which reveal ultrahigh co-catalyst free photocatalytic $H_2$ generation.

Hereinafter, the present disclosure will be explained in more detail with reference to Examples, but the present disclosure may not be limited thereto.

EXAMPLE

In the present Example, for reaction, a metal material including an alkaline metal or alkaline earth metal and an amine-containing solvent including alkylamine as a solvent were used to reduce titanium dioxide. A strongly alkaline metal solution could reduce $TiO_2$ at room temperature.

Example 1

350 mg lithium (Li) and 500 mg P25-type titanium dioxide ($TiO_2$, dry $TiO_2$ nanocrystal) were put into 50 ml ethanediamine and reacted with stirring under a nitrogen atmosphere at room temperature for 6 days. Then, the reacted solution was neutralized with hydrochloric acid and then mixed with water using a centrifuge. Then, after purifying and filtering processes, solid powder was obtained. Then, the obtained solid powder was dried in a vacuum oven for 1 day, and finally, reduced titanium dioxide was obtained.

Figure 1:
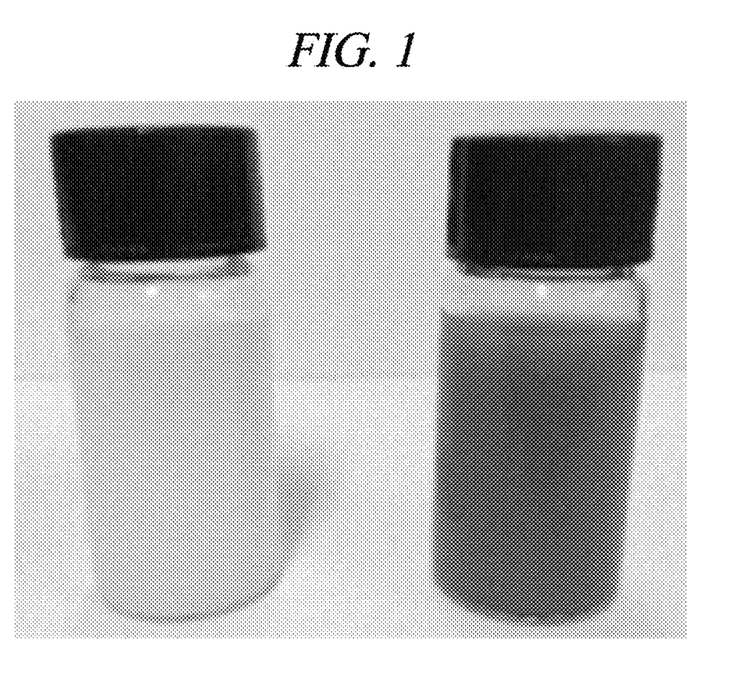
FIG. 1 provides a photo of P25-type titanium dioxide before reduction (left) and a photo of reduced titanium dioxide (right) in accordance with an example of the present disclosure.

In Example 1, reduced $TiO_2$ could be obtained by mixing an ethanediamine solvent, a metal material, and $TiO_2$, and the solution shows blue color due to solvated electrons (FIG. 1). The left side of FIG. 1 shows titanium dioxide before reduction, and the right side of FIG. 1 shows reduced titanium dioxide. After the reduction, blue-$TiO_2$ was carefully rinsed using water and/or ethanol to remove remaining metal and metal hydroxide in the present example. Then, the blue-$TiO_2$ was dried in a drying oven.

Figure 2:
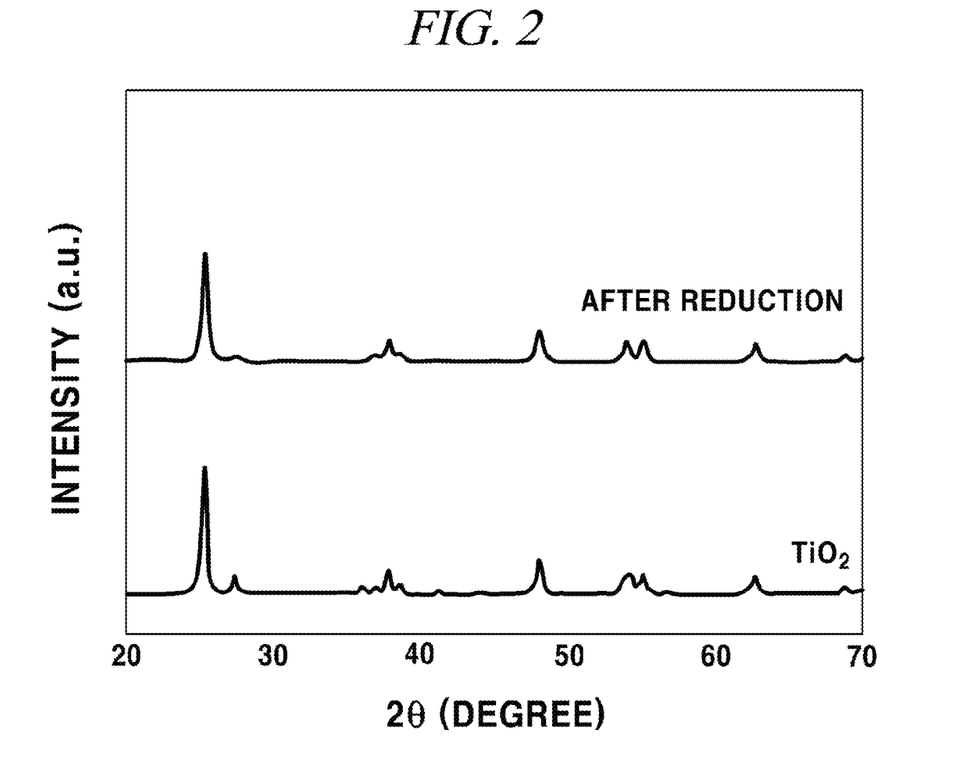
FIG. 2 provides spectra showing a change in X-ray diffraction (XRD) after reduction of titanium dioxide in accordance with an example of the present disclosure.

An X-ray diffraction analysis was conducted to the reduced titanium dioxide prepared as described above, and a result thereof was as shown in FIG. 2. FIG. 2 provides X-ray diffraction (Ultima IV, Rigaku) spectra of titanium dioxide before reduction and reduced titanium dioxide. The peaks at about 27° in the spectra show rutile structures. It was observed that the structures disappeared due to a reduction of titanium dioxide.

Figure 3A:
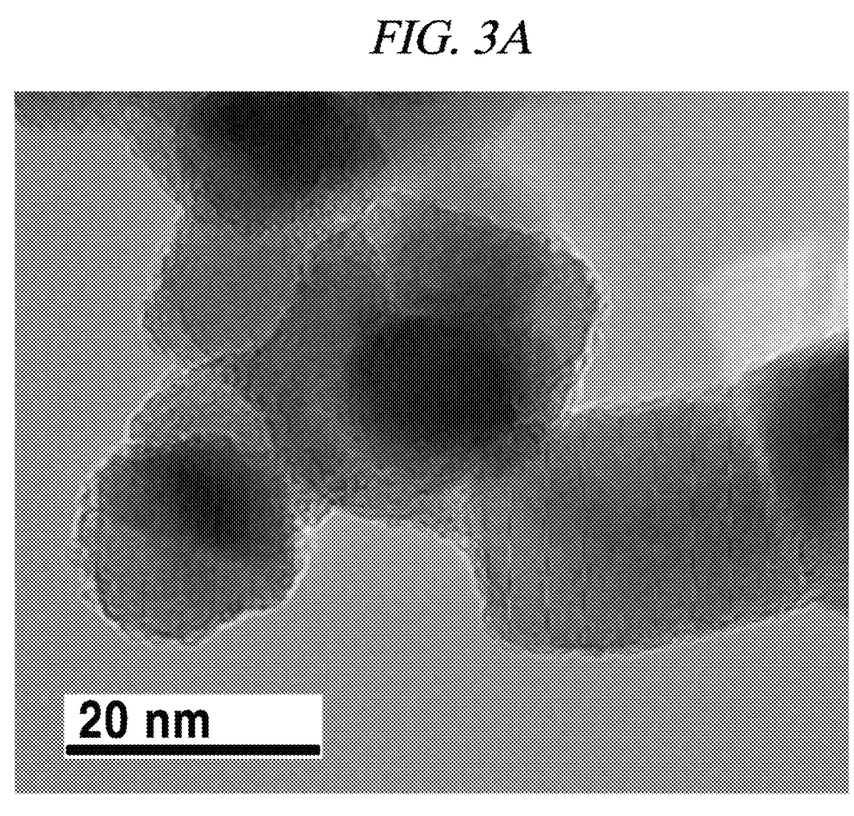
FIG. 3A is a transmission electron microscopic image of titanium dioxide before reduction in accordance with an example of the present disclosure.
Figure 3B:
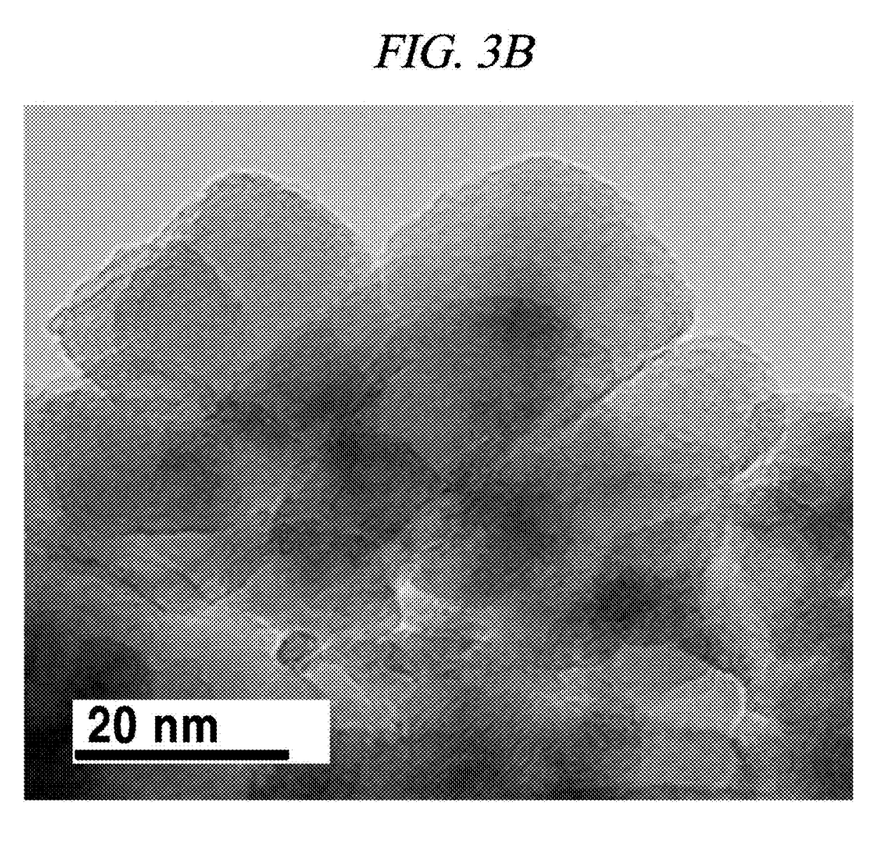
FIG. 3B is a transmission electron microscopic image of reduced titanium dioxide in accordance with an example of the present disclosure.

FIG. 3A shows a transmission electron microscopic image (TEM: JEM ARM 200F, JEOL) of titanium dioxide before reduction, and FIG. 3B shows a TEM image of reduced titanium dioxide prepared in accordance with the present example.

Example 2

14 mg metallic Li foil was dissolved in 20 ml ethanediamine to form a 1 mmol/ml solvated electron solution. 200 mg dried $TiO_2$ nanocrystals (anatase A, size: ~25 nm, rutile R, size: ~140 nm, P-25, size: 20~40 nm) were added into above solution and stirred for 6 days (Caution: the reaction needs to be performed in closed and anhydrous condition). After sufficient reaction, 1 mol/L HCl was slowly dropped into the mixture to order to quench the excess electrons and form Li salts. Finally, the resulting composite was rinsed by deionized water several times, and dried at room temperature in vacuum oven.

Figure 4:
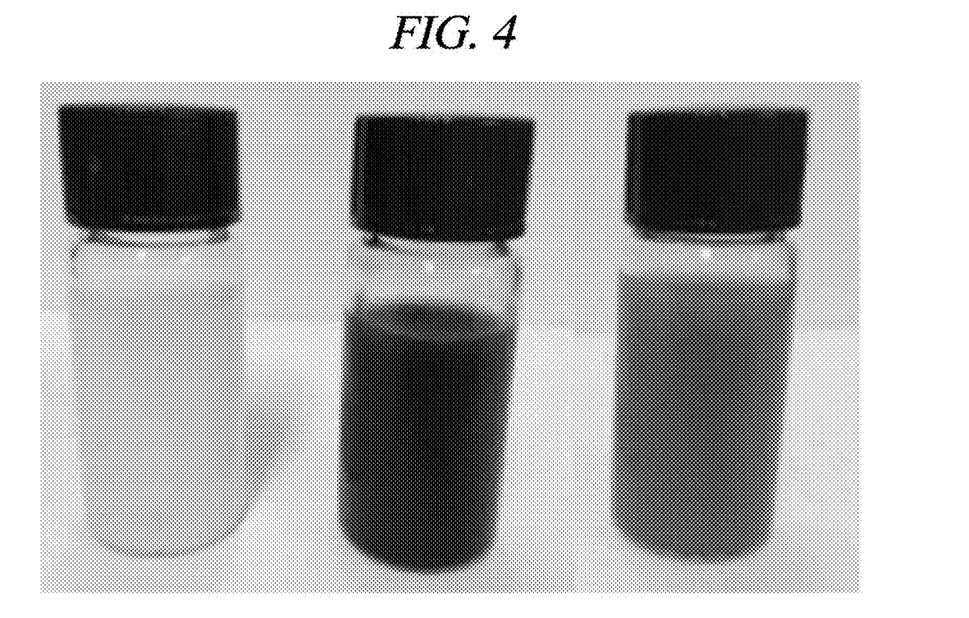
FIG. 4 is a photograph of A-$TiO_2$ (left), R—$TiO_2$ (middle) and P-25 (right) suspensions (0.05 g/L) after Li/EDA treatment for 6 days.
Figure 5:
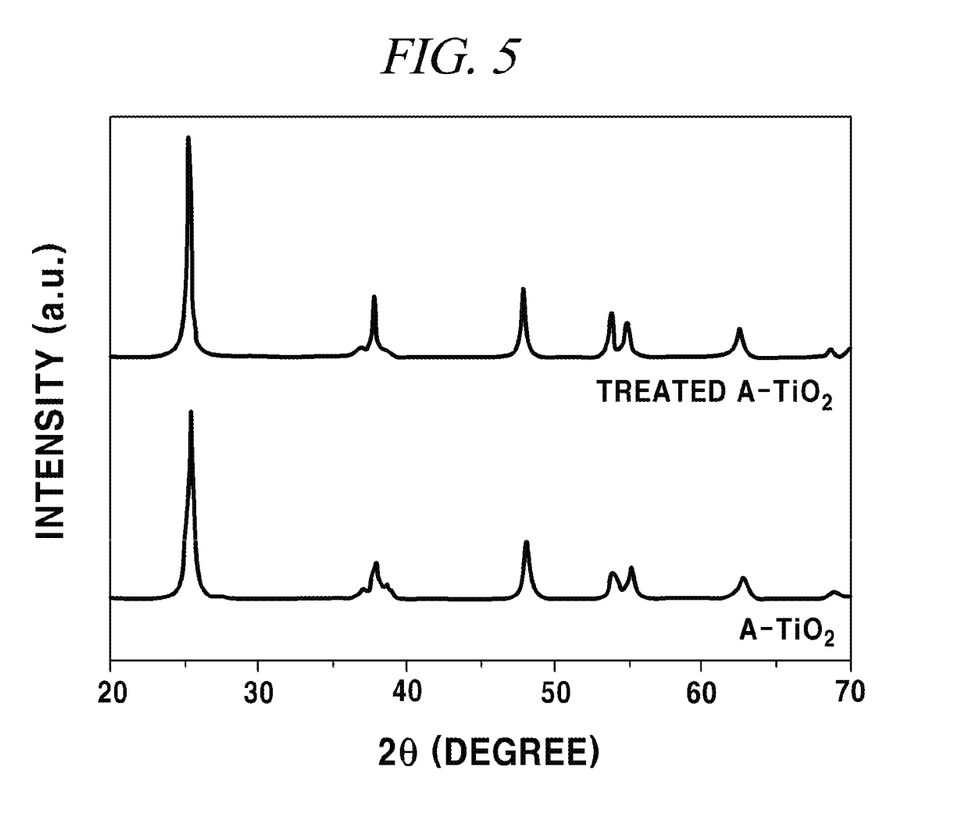
FIG. 5 shows XRD patterns of A-$TiO_2$ crystals and the Li-EDA treated A-$TiO_2$ for 6 days.
Figure 6:
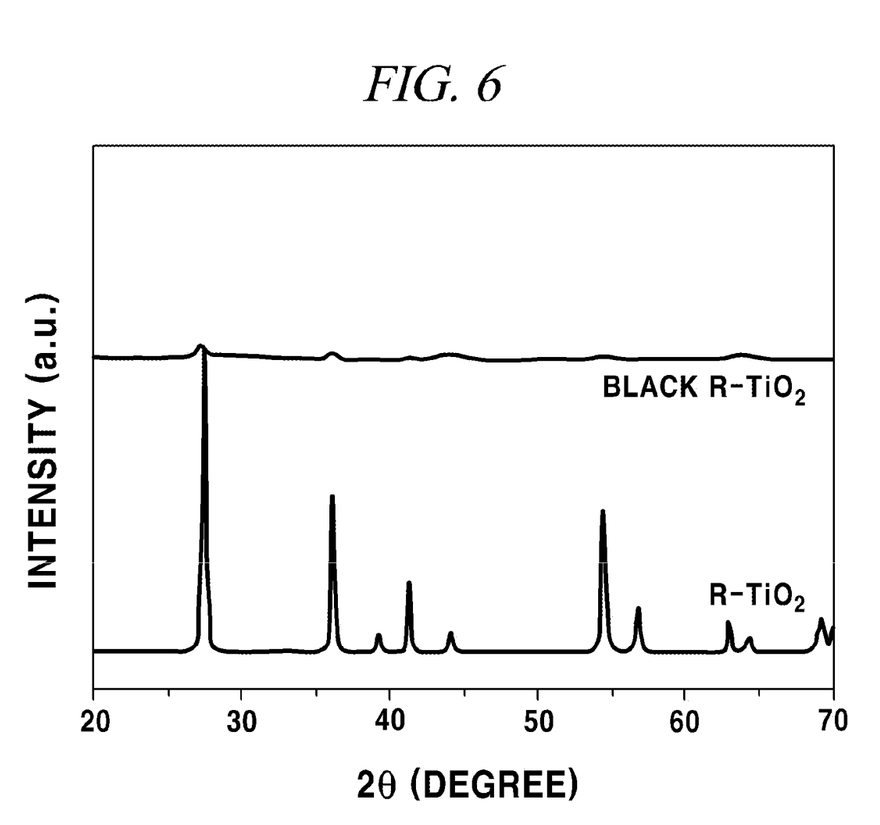
FIG. 6 shows XRD patterns of R—$TiO_2$ crystals and the Li-EDA treated R—$TiO_2$ for 6 days
Figure 7:
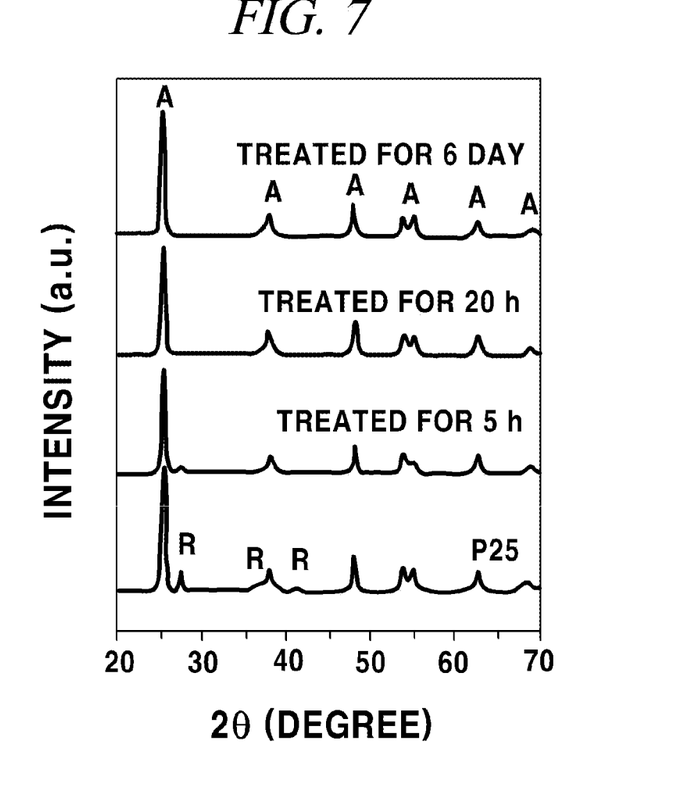
FIG. 7 shows XRD patterns of the Li/EDA-treated P-25 crystals with different treatment times; A: anatase phase and R: rutile phase.

Color and crystalline phase changes were initially observed by treating A-$TiO_2$ (approximately 20 nm), R—$TiO_2$ (approximately 140 nm) and P-25 (20-40 nm) with Li/EDA solution. As shown in the photograph (FIG. 4), A-$TiO_2$ presented unchanged white color (left) and X-ray diffraction (XRD) patterns (FIG. 5), while white R—$TiO_2$ was fully converted into black $TiO_2$ (middle, FIG. 4), and its original XRD peaks nearly disappeared (FIG. 6). Interestingly, the color of P-25 was tuned to be blue. It is believed that the modulatory color is the result of mixing white and black. FIG. 7 shows the XRD patterns of P-25 as a function of the Li/EDA solution treatment time, and no noticeable changes in the anatase peaks but the near complete disappearance of the rutile peaks after 6 days of treatment are observed.

Figure 8:
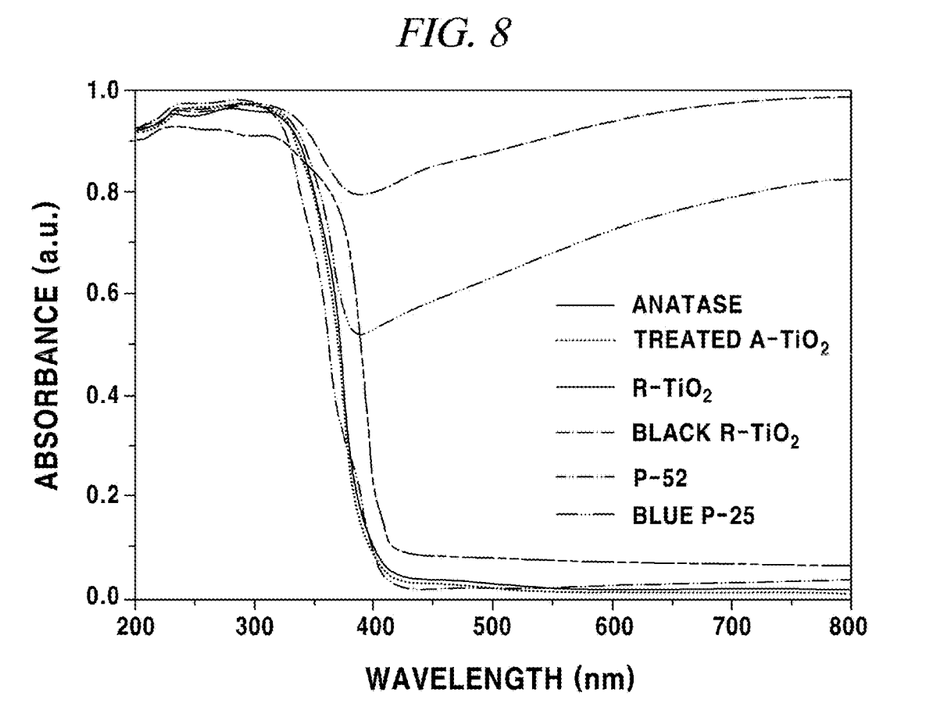
FIG. 8 shows UV-Vis absorption spectra of A-$TiO_2$, R—$TiO_2$, P-25 and the Li/EDA-treated materials

The UV-Vis absorption spectra in FIG. 8 showed that black R—TiO$_2$ exhibits an intense and broad background absorption at wavelengths longer than 800 nm, whereas no noticeable change was observed between the spectra of A-TiO$_2$ before and after treatment.

The above description of the present disclosure is provided for the purpose of illustration, and it would be understood by those skilled in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method of preparing a reduced titanium dioxide, comprising:
    mixing a metal-containing material with an amine-containing solvent to obtain a solution containing the metal and the amine; and
    obtaining the reduced titanium dioxide by mixing the solution containing the metal and the amine with titanium dioxide.

2. The method of preparing the reduced titanium dioxide of claim 1, further comprising:
    removing impurities from the reduced titanium dioxide using a solution selected from the group consisting of water, ethanol, an acid solution, an organic solvent, and combinations thereof.

3. The method of preparing the reduced titanium dioxide of claim 2,
    wherein the impurities include remaining metal and a metal hydroxide.

4. The method of preparing the reduced titanium dioxide of claim 1,
    wherein the obtaining of reduced titanium dioxide is performed at a temperature in a range of from −40° C. to 200° C.

5. The method of preparing the reduced titanium dioxide of claim 1,
    wherein the metal-containing material includes a metal selected from the group consisting of Li, Na, K, Rb, Cs, Fr, Be, Mg, Ca, Sr, Ba, Ra, and combinations thereof.

6. The method of preparing the reduced titanium dioxide of claim 1,
    wherein the amine-containing solvent includes a $C_1$-$C_{21}$ alkylamine or ammonia.

7. The method of preparing the reduced titanium dioxide of claim 1,
    wherein the solution containing the metal and the amine has basic property.

8. A reduced titanium dioxide, which comprises rutile titanium dioxide in a reduced state and includes a disordered surface of the reduced rutile titanium dioxide coexisting with an ordered surface of an anatase titanium dioxide and without a disordered surface of an anatase titanium dioxide.

9. The reduced titanium dioxide of claim 8,
    wherein the reduced rutile titanium dioxide comprises a black color.

10. The reduced titanium dioxide of claim 8,
    wherein the reduced titanium dioxide comprises a blue color since it is formed by selectively reducing only the rutile titanium dioxide in titanium dioxide in which the rutile titanium dioxide coexists with the anatase-titanium dioxide.

11. A photocatalyst comprising the reduced titanium dioxide according to claim 8.

12. The reduced titanium dioxide of claim 8, further comprising a three-phase interface having an open structure.

13. The reduced titanium dioxide of claim 8, wherein the reduced state is characterized by a local peak of a X-ray diffraction pattern at 27 degrees of the reduced titanium dioxide that is diminished compared to the titanium dioxide in an unreduced state.

14. The reduced titanium dioxide of claim 9, wherein an absence of rutile-specific peaks of a X-ray diffraction pattern of the reduced titanium dioxide correspond to the black color.

15. The reduced titanium dioxide of claim 8, wherein an interface between the disordered surface of the reduced rutile titanium dioxide and the ordered surface of the anatase titanium dioxide is a staggered gap (type-II) heterojunction.

* * * * *